(12) United States Patent
Landon

(10) Patent No.: US 9,784,571 B2
(45) Date of Patent: Oct. 10, 2017

(54) METHOD AND APPARATUS FOR 3D IMAGING A WORKPIECE

(71) Applicant: Eastern Kentucky University, Richmond, KY (US)

(72) Inventor: George V. Landon, Richmond, KY (US)

(73) Assignee: Eastern Kentucky University, Richmond, KY (US)

(*) Notice: Subject to any disclaimer, the term of this patent is extended or adjusted under 35 U.S.C. 154(b) by 574 days.

(21) Appl. No.: 14/278,111

(22) Filed: May 15, 2014

(65) Prior Publication Data

US 2014/0340485 A1 Nov. 20, 2014

Related U.S. Application Data

(60) Provisional application No. 61/823,468, filed on May 15, 2013.

(51) Int. Cl.
*H04N 15/00* (2006.01)
*H04N 13/00* (2006.01)
*H04N 13/02* (2006.01)
*G01B 11/25* (2006.01)
*G06T 7/55* (2017.01)

(52) U.S. Cl.
CPC ............ *G01B 11/2527* (2013.01); *G06T 7/55* (2017.01)

(58) Field of Classification Search
CPC .......................... G06T 7/0065; G06T 11/2527
USPC .......................................................... 348/47
See application file for complete search history.

(56) References Cited

U.S. PATENT DOCUMENTS

2008/0063260 A1* 3/2008 Lin .................... G01B 11/2509
382/154

OTHER PUBLICATIONS

Tarini et al., 3D acquisition of mirroring objects using striped patterns, Feb. 16, 2005, Graphical Models 67 (2005) 233-259.*
Unser et al., Convolution-B ased Interpolation for Fast, High-Quality Rotation of Images, IEEE Transactions on Image Processing. vol. 4. No. IO. Oct. 1995.*

(Continued)

*Primary Examiner* — Jorge L Ortiz Criado
*Assistant Examiner* — Boubacar Abdou Tchoussou
(74) *Attorney, Agent, or Firm* — Stoll Keenon Ogden PLLC; Dana R. Howard

(57) ABSTRACT

To obtain a three-dimensional virtual reconstruction of a workpiece the workpiece is positioned on a display screen between the display screen and at least one imager wherein the imager acquires multiple images of the workpiece while (a) multiple light stripes are displayed and swept in a first directional orientation across the display screen, (b) multiple light stripes are displayed and swept in at least one second directional orientation across the display screen, and (c) multiple images for each position of the multiple light stripes at different exposure times are captured. From the multiple images, a difference caused by the workpiece in a width and a profile of the multiple light stripes is determined. That difference is used to calculate a depth value (z) of the workpiece at each imager pixel position (x, y). The calculated depth value is used to reconstruct a surface shape of the workpiece. In embodiments, the described transmittance light capture analyses are supplemented with reflectance light capture analyses.

12 Claims, 10 Drawing Sheets

(56) References Cited

OTHER PUBLICATIONS

George V. Landon, et al.; "A New System to Acquire and Restore Document Shape and Content"; Association for Computing Machinery, Inc.; PROCAMS (Aug. 10, 2008); 8 pages.
George V. Landon, et al.; "A New Technique for the Digitization and Restoration of Deteriorated Photographic Negatives"; EURASIP Journal on Image and Video Processing, vol. 2009, Article ID 217016, 13 pages.

* cited by examiner

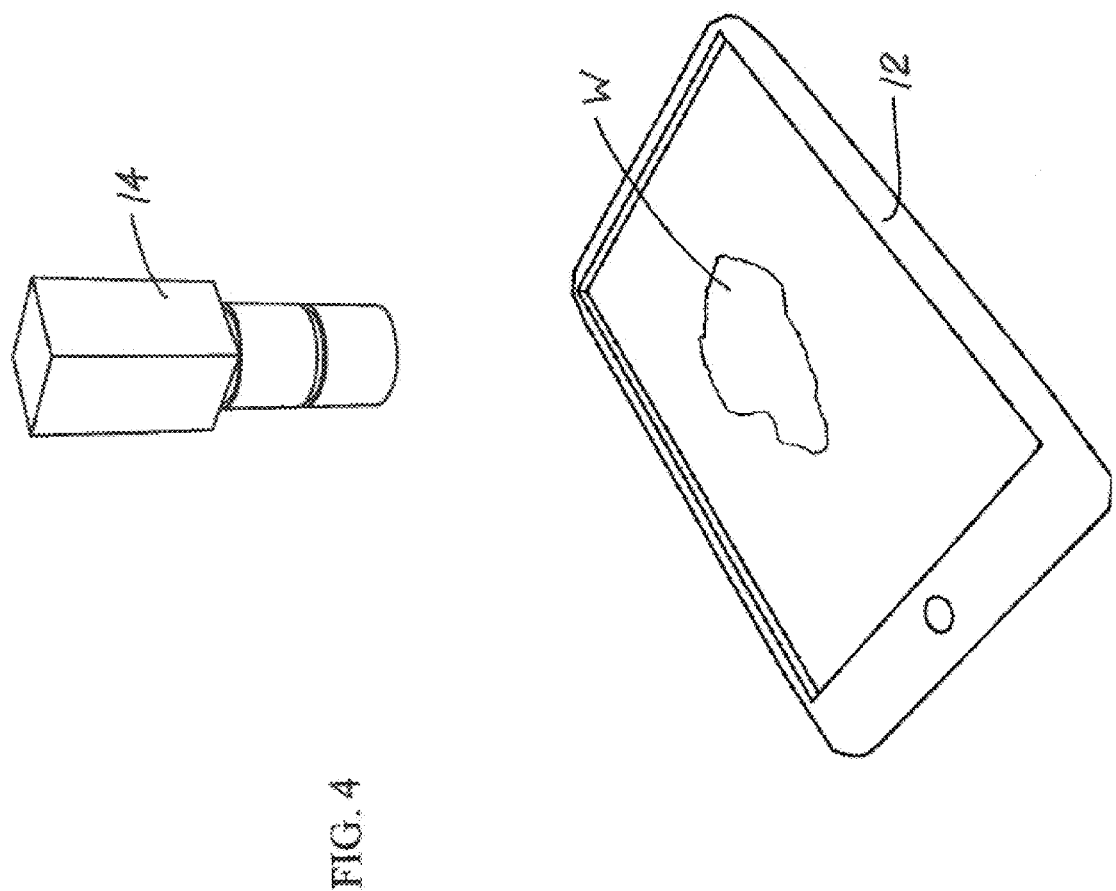

METHOD AND APPARATUS FOR 3D IMAGING A WORKPIECE

This utility patent application claims the benefit of priority in U.S. Provisional Patent Application Ser. No. 61/823, 468 filed on May 15, 2013, the entirety of the disclosure of which is incorporated herein by reference.

TECHNICAL FIELD

The present disclosure relates to human-computer interaction systems. More specifically, this disclosure pertains to methods and systems for three-dimensional (3D) imaging of workpieces allowing transmission of light therethrough. Automated methods are provided to remove non-linear distortions caused by deterioration of the workpieces by estimating an image pixel depth and therefrom a surface reconstruction of the workpiece. In embodiments, high-dynamic-range (HDR) structured-light scanning methods are used and a 2D Gaussian model for light transmission is estimated for each captured pixel of the workpiece image. A Principle Component Analysis is then used to estimate the photometric error and effectively restore the original illumination information. Using the shift in Gaussian light stripes between pixels and variations in standard deviation, a 3D surface estimate of the workpiece is calculated. Embodiments incorporating comparison of light transmitted through and light reflected from the workpiece are contemplated.

COPYRIGHTED MATERIALS

A portion of the disclosure of this document contains materials to which a claim of copyright protection is made. The copyright owner has no objection to the reproduction by anyone of the patent document or the patent disclosure as it appears in the U.S. Patent and Trademark Office patent files or records, but reserves all other rights with respect to the copyrighted work.

BACKGROUND OF THE INVENTION

The present disclosure is directed to methods and systems for 3D imaging of various workpieces including damaged workpieces, to allow digitization and reconstruction thereof. For example, safety acetate film was previously the prevailing media for photographic recording, and vast collections of acetate negatives are currently preserved in the world's memory institutions. However, even properly preserved acetate negatives deteriorate beyond a point of feasible reading or digitization by conventional techniques. The negatives decay due to a chemical reaction that releases acetic acid, leaving the base (acetate) and photographic (emulsion) layers unstable. As a part of this decomposition process, the layers shrink and wrinkle, leaving large channels through the negative.

Physical restoration is possible, but is a complex process requiring physically separating the negative layers and reseating the emulsion layer on a new base layer. While effective, the process is too time consuming, labor intensive, and costly when considering restoration of large collections.

Accordingly, there is a need in the art for methods and systems for digitally or virtually restoring damaged negatives and other such workpieces with minimal human intervention. The present disclosure provides such methods and systems for digitizing workpieces such as photographic negatives and other objects which do not fit a typical scanning paradigm.

SUMMARY OF THE INVENTION

To solve the foregoing problems and address the identified need in the art, the present disclosure provides methods of and systems for three-dimensional virtual reconstruction of a surface of a workpiece. In one aspect, methods for 3D reconstruction include positioning a workpiece to be virtually reconstructed on a display screen between the display screen and at least one imager. Multiple images of the workpiece are acquired by the at least one while (a) displaying and sweeping multiple light stripes in a first directional orientation across each pixel of the display screen in a display region being viewed by said imager, (b) displaying and sweeping multiple light stripes in at least one second directional orientation across each pixel of the display screen in a display region being viewed by the imager with the second directional orientation being different from said first directional orientation, and (c) capturing said multiple images for each position of said multiple light stripes at different exposure times. A computing device including at least one processor and at least one memory uses data from the multiple images to determine a difference in a width and a profile of the multiple light stripes caused by the workpiece as light from the multiple light stripes is transmitted therethrough. Then, from those determined differences is calculated a depth value (z) of said workpiece at each imager pixel position (x, y). A surface shape of the workpiece can be virtually reconstructed from the calculated depth values.

In embodiments, the step of determining a difference in the width and the profile of said multiple light stripes caused by said workpiece includes steps of rotating measured light intensity values to center one of the multiple light stripes over each imager pixel and estimating skew-normal parameters for each of the transmitted shapes of the centered multiple light stripes. Then, Gaussian parameters are estimated for each of the transmitted shapes of the centered multiple light stripes from the estimated skew-normal parameters. The estimated Gaussian parameters for each of the transmitted shapes of the multiple light stripes are compared to estimated Gaussian parameters for calibration images (without a positioned workpiece) of the multiple light stripes acquired from the display screen, to identify changes in width and profile of the multiple light stripes introduced by positioning the workpiece on the display screen.

In another aspect, a system for three-dimensional virtual reconstruction of a workpiece is provided. The system may include a display screen for displaying and sweeping multiple light stripes in a first and a second directional orientation across each pixel of the display screen as described above. At least one imager is positioned to acquire multiple images of a workpiece positioned between the at least one imager and a display region of said display screen at different exposure times. A non-transitory computer program product operable on a computing device having at least one processor, at least one memory, and at least one graphical user interface is provided, wherein the at least one computer program product includes executable instructions for acquiring the data of the multiple images, for determining a difference in a width and a profile of said multiple light stripes caused by said workpiece, and for calculating from determined difference a depth value (z) of said workpiece at each imager pixel position (x, y), and from said calculated depth value reconstructing a surface shape of said workpiece. The computer program product further includes executable instructions for determining a difference in the width and the profile of said multiple light stripes caused by said workpiece substantially by the method as described above.

In yet another aspect, an analysis of light reflectance may be included with the analysis of light transmittance as summarized above. Light reflectance from the workpiece is accomplished by positioning a second light source for emitting light to a surface of the workpiece, the second light source being disposed on a same side of the workpiece as the at least one imager. The second light source may be a second display screen for displaying and sweeping multiple second display screen light stripes in a first and a second directional orientation across each pixel of said second display screen in a display region being viewed by said at least one imager, as described above for the display screen. The at least one imager acquires multiple images of the workpiece resulting from light reflecting from the workpiece surface. The reflectance analyses of the multiple images may be compared to or combined with the transmittance analyses as described above to further refine the virtually reconstructed surface shape of the workpiece.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims. Unless otherwise indicated, any patent and/or non-patent citations discussed herein are specifically incorporated by reference in their entirety into the present disclosure.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 4 depicts a workpiece interposed between a display screen and a camera according to the present disclosure;

DETAILED DESCRIPTION OF THE INVENTION

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention. Also, it is to be understood that other embodiments may be utilized and that process, reagent, materials, software, and/or other changes may be made without departing from the scope of the present invention.

Figure 1:
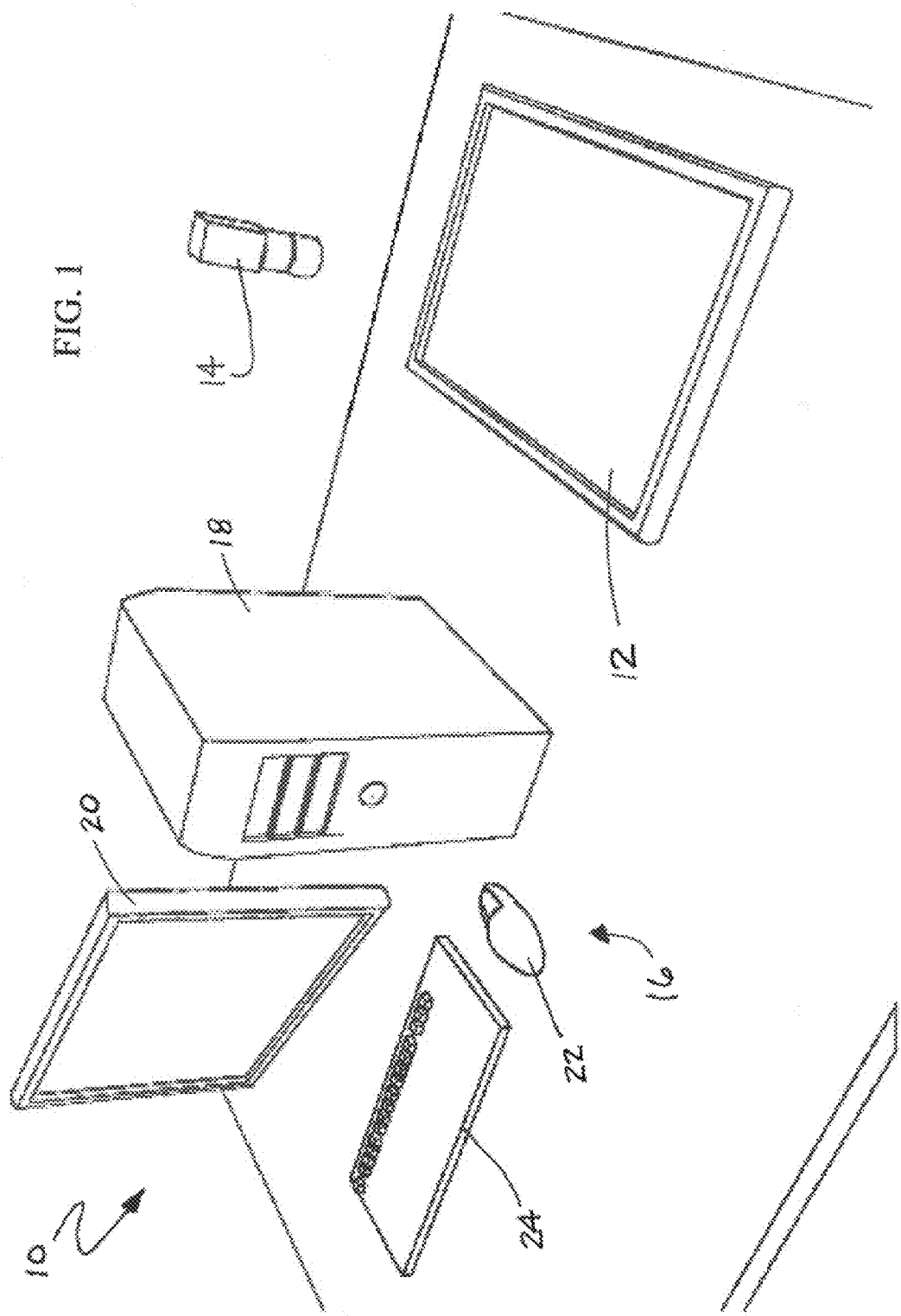
FIG. 1 shows an embodiment of a system for 3D reconstruction of a workpiece according to the present disclosure.

Reference is now made to FIG. 1 schematically illustrating a 3D workpiece imaging system 10 which may be broadly described as comprising a display screen 12 such as an LCD monitor, an imager 14 and a computing system 16. The imager 14 may be any suitable imager, such as a digital camera capable of converting image data to digital data for subsequent processing. The computing system 16 includes a computing device 18 and a series of input/output devices and human interfaces such as a display monitor 20 including a mouse 22 and a keyboard 24.

Figure 2:
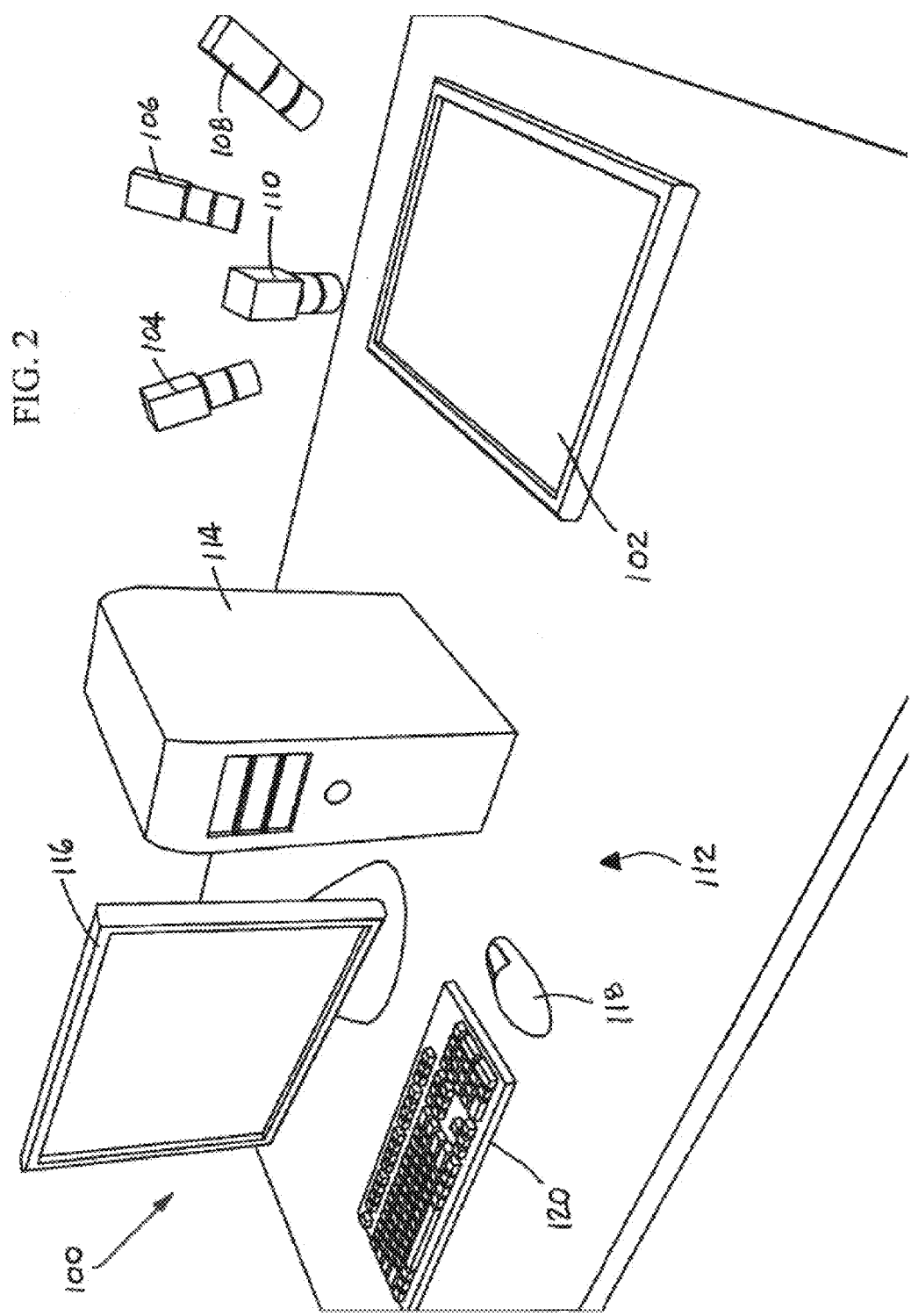
FIG. 2 shows an alternative embodiment of a system for 3D reconstruction of a workpiece according to the present disclosure.

In an alternative embodiment illustrated in FIG. 2, the 3D workpiece imaging system 100 includes a display screen 102, multiple imagers 104, 106, 108 and 110 and a computing system 112. The computing system 112 includes a computing device 114 and a series of input/output devices such as a display monitor 116 and human interfaces including a mouse 118 and a keyboard 120.

Figure 3:
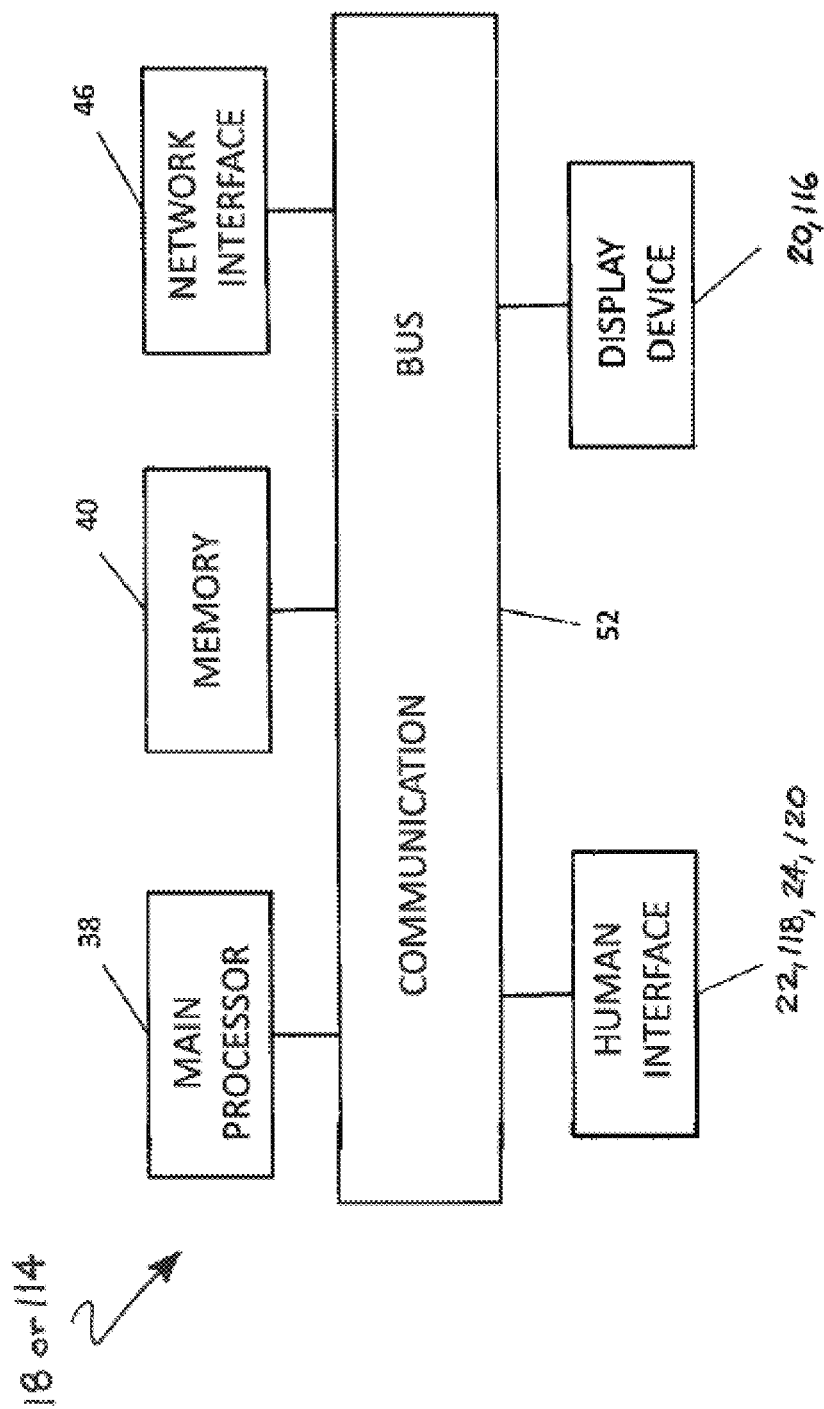
FIG. 3 schematically shows a computing system for effecting the methods of the present disclosure.

As illustrated in FIG. 3, the computing device 18, 114 of either embodiment includes one or more processors 38 and one or more memories 40. Further, the computing device 18, 114 includes one or more network interfaces 46 and one or more input/output devices and human interfaces such as the display monitors 20, 116 such as a mouse 22, 118 and a keyboard 24, 120. As should be appreciated, all of these components 38, 40, 46, 20, 116, 22, 118, 24, 120 communicate with each other over a communications bus 52.

As should be appreciated, substantially any computing device 18, 114 having a processor can be utilized. Thus, the computing device 18, 114 may take the form of a server, a laptop, a digital assistant, a tablet computer, a personal computer, a smartphone, or other computing device that would execute computer readable instructions. The processor 38 may be referred to as a main processor or central processing unit (CPU). The processor 38 may include a single or multiple processing cores. Where two or more cores are provided, the cores may be capable of operating in parallel.

The memory 40 may comprise any number or combination of memory devices including but not limited to cache memory, such as static random access memory (SRAM), dynamic random access memory (DRAM) enhanced DRAM or the like. Any storage repository or non-transitory machine readable storage medium of a type known in the art may also be used. The processor 38 accesses the memory 40 through the communications bus 52 to access any application or data stored thereon including, but not limited to, any computer readable instructions. More specifically, memory 40 would include a number of things including but not limited to the operating system, collected experimental data including images and software applications the user would interface with to collect that data. The software application could be a standalone application or it could be a collection of software presented in one package. Software useful for the present apparatus and method includes the copyrighted software program entitled "3D Shape Reconstruction from Transmittance, available from Eastern Kentucky University," which is incorporated herein by reference.

The network interface 46 may be used to interface with any network. The network may comprise any network of a type known in the art including but not limited to a local area network (LAN), a wide area network (WAN), a wireless network or any other network or network of networks including that generally known as the internet.

The method of 3D imaging a workpiece W will now be described. The examples described herein utilized light emitted at the visible wavelength. However, it is worthy of note that the methods of the present disclosure are wavelength-independent, and that use of non-visible light wavelengths is also contemplated, including without limitation infrared, near-infrared, ultraviolet, x-ray, and the like. It is only necessary that the provided imager be able to capture such light wavelengths and create images therefrom.

The method includes the step of positioning a workpiece W on a display screen 12 between the display screen 12 and the imager 14. See FIG. 4. The method further includes the step of acquiring multiple images of the workpiece W using high-dynamic range imaging by (a) displaying and sweeping multiple light stripes 26 in a first directional orientation across each pixel of the display screen 12 in a display region being viewed by the imager 14, (b) displaying and sweeping multiple light stripes 26' in at least one second directional orientation across each pixel of the display screen 12 in a display region being viewed by the imager 14 and (c) capturing the multiple images for each position of the multiple light stripes at different exposure times. This base structured-light pattern is used to capture illumination from various incident angles. This is followed by rotating the measured light intensity values to center one of the multiple light stripes over each imager 14 pixel.

Next is estimating the skew-normal parameters for each of the transmitted shapes of the centered multiple light stripes. This is followed by estimating the Gaussian parameters for each of the transmitted shapes of the centered multiple light stripes from a skew-normal fitting. The method then includes a step of comparing the estimated Gaussian parameters for each of the transmitted shapes of the multiple light stripes 26, 26' to Gaussian parameters for calibration images of the multiple light stripes to identify changes in brightness, width and profile introduced by positioning the workpiece W on the display screen 12. This is then followed by reconstructing a surface of the workpiece W by estimating a depth value (z) of the workpiece W at each imager 14 pixel position (x, y).

In some embodiments of the method, five different exposure times are used. It is contemplated that anywhere from 1 to 10 different exposure times may be used for any particular application.

Some method embodiments include the step of acquiring the calibration images using high-dynamic range imaging by (a) displaying and sweeping multiple light stripes 26 in the first orientation across each pixel of the display screen 12 in a display region being viewed by the imager 14, (b) displaying and sweeping multiple light stripes 26' in the second directional orientation across each pixel of the display screen 12 in a display region being viewed by the imager 14 and (c) capturing the multiple images for each position of the multiple light stripes 26, 26' at different exposure times when nothing is positioned on the display screen 12 between the display screen 12 and the imager 14.

In some embodiments of the method, the method includes using both location and standard deviation to estimate the depth value (z) for each of the multiple light stripes 26, 26'. In some embodiments the method includes extracting small detail variations of the transmitted shapes by performing additional location filtering. In some embodiments of the method, the method includes extracting gradual variations of the transmitted shapes by performing additional standard deviation filtering. In some embodiments of the method, the method includes merging the gradual variations with the small detail variations to create a single representation for a surface angle of the orientation. Further, in some embodiments of the method, the method includes using surface angle estimation for all orientation, and integrating over surface to estimate height (z) at each pixel position (x, y). Some embodiments of the method also include using a gray scale display screen 12 for additional sensitivity and more accurate reconstruction.

Still further, some embodiments of the method include acquiring multiple images of the workpiece W using high-dynamic range imaging by (a) displaying and sweeping multiple light stripes in at least one additional directional orientation across each pixel of the display screen 12 in a display region being viewed by the imager 14, (b) displaying and sweeping multiple light stripes in the at least one additional directional orientation across each pixel of the display screen 12 in a display region being viewed by the imager and (c) capturing said multiple images for each position of the multiple light stripes at different exposure times. Thus, the first directional orientation may be across the screen from left-to-right while the second directional orientation may be across the screen from top-to-bottom. In some applications, additional orientations could include diagonally from upper left corner to lower right corner and diagonally from lower left corner to upper right corner.

Some embodiments of the method include using multiple imagers 104, 106, 108, 110 to view the display region. Some embodiments of the method include using sinc-based interpolation to rotate the measured light intensity values and center one of the multiple light stripes 26, 26' over each imager 14 pixel. Some embodiments of the method include estimating the metric position of each of the multiple light stripes 26, 26' on the display screen 12.

Further, some embodiments of the method include completing metric calibration to compensate for different size pixels on different display screens 12, 102. In addition, some embodiments of the method include using a computing device 18, 114 to rotate the measured light intensity values to center one of the multiple light stripes 26, 26' over each imager 14 pixel. Some embodiments of the method include using a computing device 18, 114 to estimate the Gaussian parameters for each of the transmitted shapes of the centered multiple light stripes 26, 26' from the skew-normal fitting. Some embodiments of the method include using a computing device 18, 114 to compare the estimated Gaussian parameters for each of the transmitted shapes of the multiple light stripes 26, 26' to Gaussian parameters for calibration images of the multiple light stripes 26, 26' to identify changes in stripe width and profile introduced by positioning the workpiece W on the display screen. Further, some embodiments of the method include using a computing device 18, 114 to reconstruct the surface of the workpiece W by estimating a depth value (z) of the workpiece W at each imager 14 pixel position (x, y).

In more detail, image acquisition is typically performed as a two-step process. An initial set of images is taken to develop a base model to describe how the multiple light stripes 26, 26' are observed by each imager 14 pixel. This step provides a calibration process for the light stripe properties in each imager 14 pixel. It is important that the calibration step is performed without a workpiece W placed between the display and the imager 14. The calibration will also be accurate for multiple material scans while there are no changes in relative position between the display and imager 14, and while there are no changes in the display or imager 14 settings.

A second step of material (workpiece W) scanning with the workpiece W positioned between the display screen 12 and the imager 14 is then performed to allow direct comparison between each pixel's baseline calibration and the transmitted illumination changes introduced by the workpiece W position. In an embodiment, for both calibration and workpiece scans images of vertical stripes, moving left to right, and horizontal stripes, moving top to bottom, are captured. It is also possible to increase the accuracy by increasing the shape detail captured by using more stripe orientations such as various diagonal orientations.

Next is a step of determining a metric position of the stripes on the display. Since multiple stripes will be displayed simultaneously, it is important to be able to differentiate the position of each stripe while also calculating which stripes on the display are visible in the imager 14 view. This is determined by displaying each stripe individually at its relative stopping position and calculating if it is visible in the imager 14 view. In this way, for each stripe it is possible to store as a true or false value if the stripe position should be used when calculating the relative stripe positions.

Then, images are acquired from both the calibration and the workpiece scans. As discussed above, multiple Gaussian stripes are displayed on the display screen 12. The spacing between the stripes and the width of the stripes (standard deviation) determine how many stripes are displayed on the screen. During the scanning steps, it is necessary for a stripe to pass through each pixel in the display region that the imager 14 can view. Therefore, increasing the number of stripes reduces the acquisition time since multiple stripes cover the area more quickly. However, by increasing the number of stripes, it also becomes more difficult to distinguish between which stripes are emitting the imager 14 observed light. In embodiments, during scanning stripe width may be set at 100 with range of 50-350, stripe skip as a factor of stripe width may be 2 or 4, and stripe spacing may be 2 with a range of 1-10.

To extend a range and measurement precision of the intensity values of each stripe captured by the imager 14, a High-Dynamic Range Imaging (HDRI) technique is employed during the acquisition steps. Each striped position is captured by the imager 14 using different exposure speeds. In embodiments, a range for the number of exposures may be 4-7. A value of 5 is used in the embodiment described below. Exposure times may be 2 ms, 4.94 ms, 12.20 ms, 30.14 ms, and 74.44 ms.

Next, a high dynamic range image must be estimated. To convert multiple low-dynamic range images (the typical images acquired by the imager 14), the imager 14 response function must be estimated. While low-dynamic range images are only able to store illumination variations of the values 0-255, High-Dynamic Range images use floating point (fractional) values to store a much larger range of illumination variations. Using multiple images of the same scene each with different exposures, it is possible to estimate the irradiance values of the scene and the imager 14 response function which is how the imager 14 converts scene irradiance values $E_i$ into typical 0-255 integer values $z_{ij}$. $z_{ij}=f(E_i \Delta t_j)$ The imager 14 response function $f(\ )$ is estimated using known intensity $z_{ij}$ and exposure time $\Delta t_j$ values. Once the HDRI technique is executed, all stripe intensity values are converted from integer values with the range 0-255 to a number with floating-point precision.

A step of correcting each stripe for each pixel follows. The methods described below assume that each imager 14 pixel observed a single stripe passing through its view. However, when multiple stripes are displayed, a majority of the imager 14 pixels will observe pieces of two individual stripes with the peak shifted to the left or right. Therefore, it is necessary to join these two partial stripes into a complete stripe with the peak centered. This is done by rotating the measured intensity values to provide a consistent stripe shape (e.g. the peak in the middle of the samples and sloping to zero on the left and right. Each stripe for each pixel must be corrected, including pixels viewing only the monitor (measuring large amounts of light) and pixels viewing regions of nearly opaque workpieces W (measuring small amounts of light). Therefore, the light measurements must be normalized to avoid customized algorithms for each case. Once normalized, the lowest measurement for each stripe will be zero and the highest measurement will be one for every case.

For a typical Gaussian stripe profile, there will be two inflection points: one on each side of the peak. The rising inflection point on the left and the falling inflection point on the right of the peak. The mid-point between these two inflection points will estimate the position of the peak. Since it is not possible to capture images of the stripes at every location as they are moved across the monitor, it is very likely that the brightest point of the stripe will not be captured by each pixel. Therefore, it is necessary to estimate the position of the brightest point of the stripe to determine its position. This is referred to as signal reconstruction.

Detecting the location of the peak is performed with Sinc-based interpolation iterative refinement. Using an initial estimate for $x_{max}$ as the scanned position with the highest intensity, this position is slightly improved using the rest of the scanned values and estimating a smooth curve. The fractional value, $\delta$, is estimated using:

$$\delta = \delta - \frac{\mathrm{sinc}'(x_{max}, \delta)}{\mathrm{sinc}''(x_{max}, \delta)}$$

where up to 50 iterations are performed unless a change of less than $1\times10^{-7}$ is estimated for $\delta$. Once finished $x_{max}$ is updated as $x_{max}=x_{max}+\delta$. This position, $x_{max}$, is saved as the center of the stripe and half the number of stripe positions less than the center is saved as the stripe starting position $x_{start}$. Once $x_{start}$ is found, every intensity value is estimated using Sinc-based interpolation:

$$a(x) = \frac{\sin(\pi x)}{\pi} \sum_{n=0}^{N-1} \frac{-1^n a_n}{(x-n)}$$

Next is a step of metric calibration for both the calibration and the workpiece W scan steps. All stripe positions used during scanning are stored as pixel positions of the display. However, this leads to inconsistencies in scanning since displays will often have different sized pixels when physically measured. Using the physical specification of the particular display used, Dots Per Inch (DPI) may be converted from pixels to mm such as by a Convert mode (Mo) function using monitor DPI specifications.

A parameter estimation of each stripe profile is then undertaken. The Gaussian stripes observed by the imager 14 are often heavily distorted when transmitted through most materials such as those of the workpiece W. Therefore the Gaussian profile no longer follows the typical bell-curve shape, but is often skewed heavily to the left or right. The three parameters typically used to represent a Gaussian profile are also no longer sufficient to model the transmitted shape of the light stripe. Instead using the Skew-Normal distribution to estimate the transmitted shape, a much more accurate estimate is possible. Four parameters are used to model the shape of the observed light stripe. The parameters are given initial estimates as follows (using the method of moments
$m_1$, $m_2$, $m_3$ are the first, second, and third moments respectively.
location $$\xi' = m_1 - signof(m_3)a_1\left|\frac{m_3}{b_1}\right|^{\frac{1}{3}}$$

scale $$\omega' = \sqrt{m_2 + a_1^2\left|\frac{m_3}{b_1}\right|^{\frac{2}{3}}}$$

shape $$\alpha' = signof(m_3) * \sqrt{\frac{1}{a_1^2 + m_2\left|\frac{b_1}{m_3}\right|^{\frac{2}{3}}}}$$

amplitude $$A = \frac{Y(x_{max})\omega'\sqrt{2\pi}\,e^{\frac{(xmax-\zeta')2}{2\omega'2}}}{1 + \text{Erf}\left(\frac{\alpha'(x_{max}-\zeta')}{\sqrt{2}\,\omega'}\right)}$$

Using the estimated values of the 4 parameters needed to define the profile, a Levenberg-Marquardt non-linear least squares fitting routine is used to minimize the following equation:

$$Y + \frac{Ae^{-\frac{(x-\zeta)^2}{2\omega 2}}\left(-2 + \text{Erfc}\left(\frac{\alpha(x-\zeta)}{\sqrt{2}\,\omega}\right)\right)}{\sqrt{2\pi}\,\omega}$$

Iterative refinement continues until estimated changes are less than 0.01 or 100 iterations are performed. Once the four parameters are estimated, the non-skewed Gaussian profile is estimated based on these parameters.

Next, Gaussian parameters are estimated from the above-described skew-normal fitting for both the calibration and workpiece W scans. The three parameters required for a Gaussian model are:
position
Determined directly from the peak detection described in the previous section.

$$Mo = x_{max}$$

standard deviation
The standard deviation can be directly calculated from the estimated skew-normal parameters.

$$\sigma = \sqrt{\omega^2\left(1 - \frac{2\delta^2}{\pi}\right)} \text{ where } \delta = \frac{\alpha}{\sqrt{1+\alpha^2}}$$

Amplitude
Using the position, Mo, directly in the skew normal formula it is possible to calculate the amplitude.

$$A_{guassian} = \frac{Ae^{-\frac{(Mo-\zeta)^2}{2\omega 2}}\text{Erfc}\left(\frac{\alpha(-x+\zeta)}{\sqrt{2}\,\omega}\right)}{\sqrt{2\pi}\,\omega}$$

The estimated amplitude of the skew-normal fitting of the transmitted light stripe provides a direct measurement of transmitted light. The difference between the measured amplitude with the material in place and without gives a direct estimation for absorbance and reflectance for each region in the document (assuming total irradiance=transmittance+reflectance+absorbance).

Figure 5A:
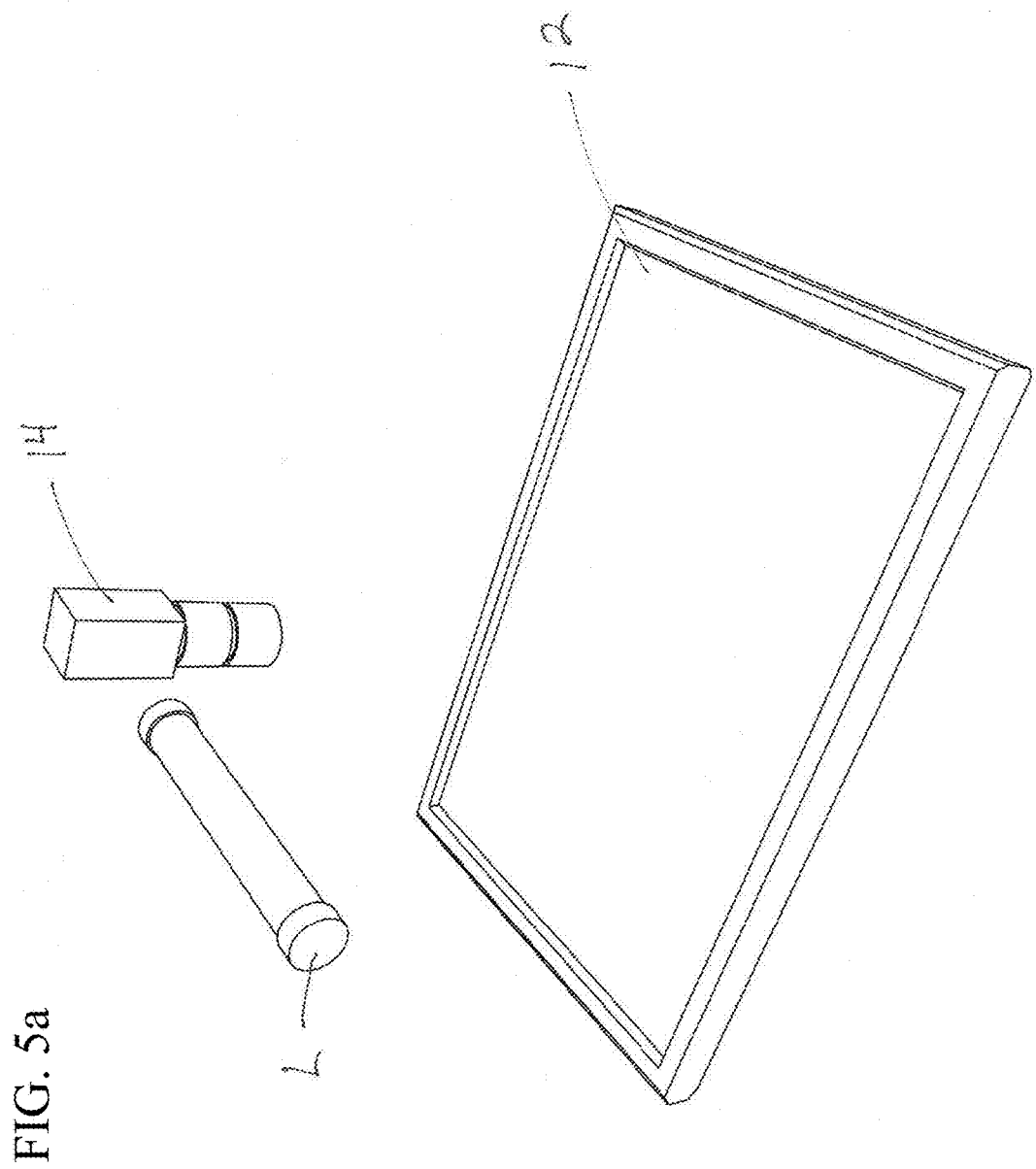
FIGS. 5a-b show embodiments of a system for 3D reconstruction of a workpiece according to the present disclosure using reflected light emitted from a single light source (FIG. 5a) or a display screen (FIG. 5b)

In another embodiment, the above analyses may be combined or supplemented with analysis of reflected light, i.e. a reflectance analysis to complement the transmitted light analysis of the workpiece W. This process requires one of a light source for emitting light to reflect from the workpiece or an additional display screen 12' substantially as described above (i.e., displaying multiple light stripes passing in multiple directional orientations as described for display screen 12) to provide a front illumination of the workpiece (see FIGS. 5a-b) and to provide multiple reflectance light stripe images for capture and analysis.

Figure 5B:
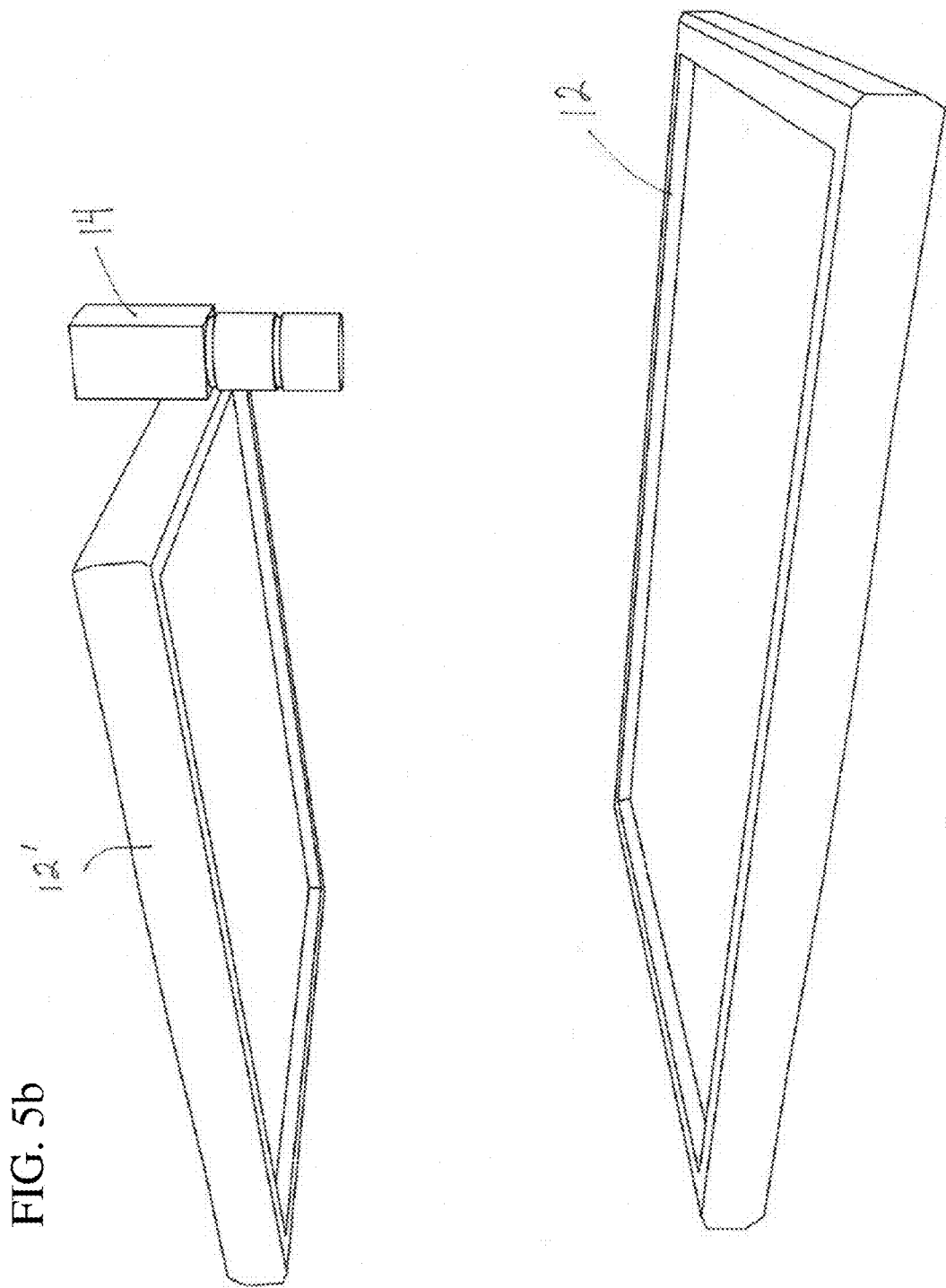
Figure 6A:
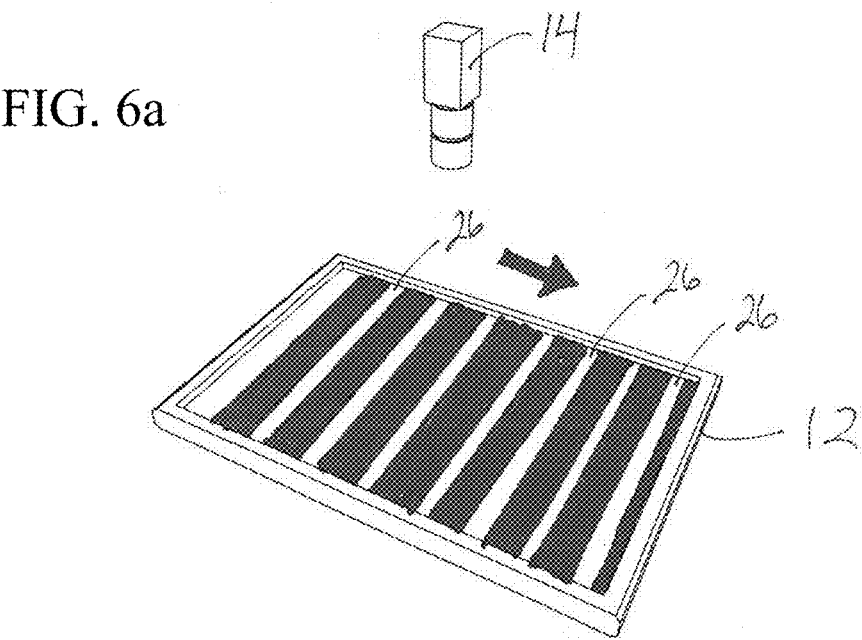
FIGS. 6a-b depict multiple light stripes sweeping behind the workpiece and across each pixel of the display screen of FIG. 4 in a first (FIG. 6a) and a second (FIG. 6b) directional orientation for transmittance image acquisition by a camera.
Figure 6B:
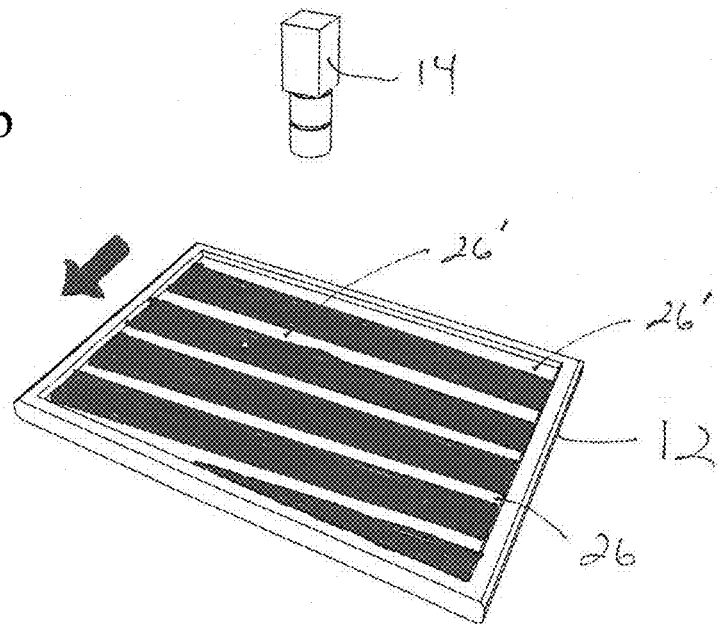

Capturing reflectance images for further analysis or rendering may be performed with a single front-side illumination source while the rear-illuminant display screen 12 described above is disabled. In embodiments, the front-side illumination may be provided by a single light source L (FIG. 5a) or by a second display screen 12' (FIG. 5b). Again 4-7 image exposures are captured. With a single, stationary illuminant, there is no change in illumination throughout the reflectance capture step. For non-planar materials, capturing images with varying illuminant positions will improve reflectance consistency across the surface of the imaged material. The front-side displayed stripes typically have a larger width of 200 or more with a similar stripe skip of 4-8 and a larger spacing of 6-10.

In embodiments providing capture of reflectance images, all stripe intensity values are also converted from integer values with the range 0-255 to a floating-point precision as described above for the conversion of low-dynamic range images to high-dynamic range images.

In turn, the process described above for correcting each stripe for each pixel is performed also for reflectance stripe image captures. The above described location, scale, shape, and amplitude parameter estimations for Gaussian stripes may be optionally performed as described above for reflectance stripe image captures. Likewise, Gaussian parameters of position, standard deviation, and amplitude from skew-normal fitting may be optionally performed as described above for reflectance stripe image captures.

As described above, the estimated amplitude of the skew-normal fitting of the transmitted light stripe provides a direct measurement of transmitted light. The difference between the measured amplitude with the material in place and without gives a direct estimation for absorbance and reflectance for each region in the document (assuming total irradiance=transmittance+reflectance+absorbance). By inclusion of reflectance stripe analysis, it is also possible to estimate workpiece W surface appearance properties for texture mapping and/or further analysis. That is, when reflectance is also captured using an illumination scan from a front side of the workpiece W, it is possible to better differentiate variations in surface properties due to varying transmission and reflectance. For example, in regions with high amplitude reflectance, but low transmission amplitude, it can be estimated that the back-side surface contains reflective properties or the material itself is nearly opaque.

If a pixel-labeling method is used, it is possible to automatically determine a threshold between reflectance and transmittance amplitudes. In the case of a duplex-sided document, there are 4 conditions or labels for each pixel.

1. Plain paper
2. Rear-side content
3. Front-side content
4. Both Rear-side and Front-side content From the transmittance only, it is possible to group the pixels into 3 distinct groups. Plain paper, content on both sides, and single sided content. For this case, the histogram of the transmittance amplitudes is tri-modal and finding the 3 largest local maxima will lead to finding the mode of each of these content groups. This leaves a direct labeling result for plan paper and front and back content pixels. However, pixels with only content on a single side remain ambiguous. Therefore, including a direct reflectance measurement provides a disambiguation for front and back-side content.

That is, the amplitude of the transmitted stripe at each pixel of the imager 14 provides an overall measured transmittance for that region of the workpiece W. This can be displayed directly on the reconstructed 3D surface to show content not represented on the shape (for example, printed text on a document).

Figure 7A:
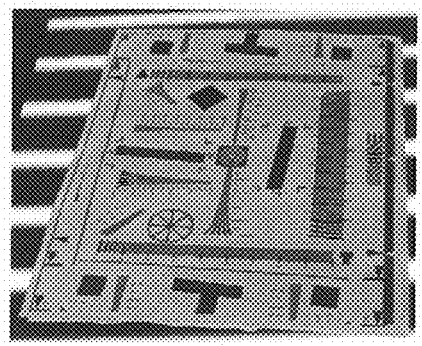
FIGS. 7a-d depict estimation of top and second layer content of a multi-layered document.
Figure 7B:
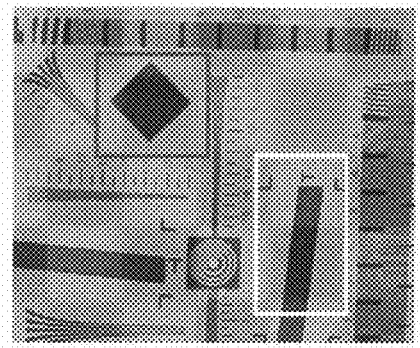
Figure 7C:
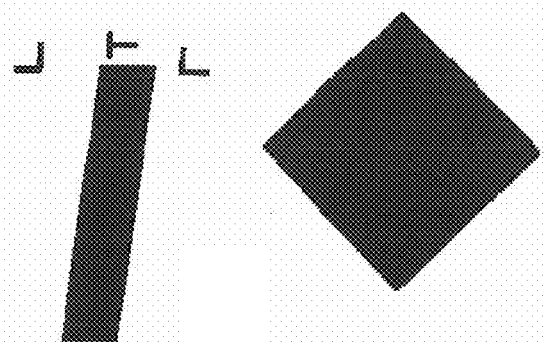
Figure 7D:
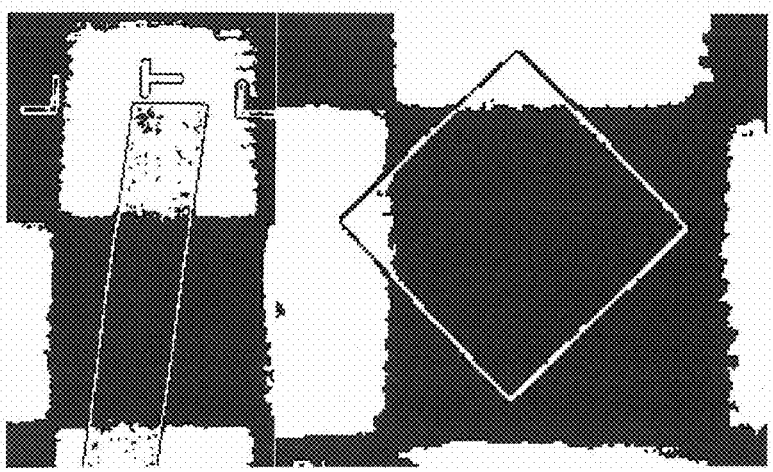

The transmitted image would show dark regions (lower amplitude) for content on both sides of a document (see FIGS. 7a-7c). This is typically due to content designed to absorb/reflect light in ways different from absorption/reflection of light by the workpiece W substrate. For example, print on a document will absorb/reflect light differently than the underlying document paper. Inclusion of reflectance analysis removes this ambiguity and allows directly identifying content such as print as being on a front or a back side of a workpiece W such as a sheet of paper. This analysis likewise applies to multi-layered documents or other workpieces where surface properties vary between the front and back sides and a user desires to differentiate between them. Using the combination of transmittance and reflectance analysis, it is possible to determine if content or some portion of a workpiece W is disposed on a front or a back side of a two-sided workpiece, or if the content is disposed on the bottom or an upper layer of a multi-layered workpiece.

This comparison may be used to automatically differentiate multi-layered documents. In the example shown in FIGS. 7a-c, two pages of paper have been non-uniformly adhered together. The page underneath contains a checkerboard pattern. The reflectance scan described above shows an estimated top layer content (see FIG. 7b). A comparison of the transmittance scan and reflectance scan reveals the estimated second layer content (FIG. 7c).

Next is a step of preparing the data collected as described above for export to a 3D reconstruction application. Without intending any limitation, the following example uses Eastern Kentucky University's copyrighted software program entitled "3D Shape Reconstruction from Transmittance." However, other 3D shape reconstruction software is known and is contemplated for use herein. First, the stripe differences introduced by the workpiece W are filtered. In that regard, T varies due to both changes in shape and material. It is possible to use the raw values of sigma, or if material changes overwhelm the shape changes must be modified to account for changes in object albedo/transparency. Use amplitude ($A_{guassian}$) to scale the sigma values accordingly and use these values as the low-frequency surface gradient content in both the X and Y directions. The mm difference of Mo is used as high-frequency surface gradient content in both the X and Y directions.

Stripe differences introduced by the workpiece W are then exported as five datasets: 1) difference of location in X $\Delta Mo_x$; 2) difference of location in Y $\Delta Mo_y$; 3) difference of standard deviation in X $\Delta \sigma_x$; 4) difference of standard deviation in Y $\Delta \sigma_y$; and 5) texture (amplitude or traditional reflectance image). For texture, the dataset may be the amplitude of Gaussian to show transmission of light (max ($\Delta A_x, \Delta A_y$)). Additional reflectance images may be captured with either a single front light source or a series of light stripe patterns from a frontal LCD as described above.

The 3D reconstruction application performs a depth estimation for each image pixel. For each (x, y) position in the image, a depth (z) is estimated using the difference of the estimated parameters from the fitting performed previously. These estimations are performed in the frequency domain, so the parameters must be transformed using a Discrete Fourier Transform (DFT). Each of the estimated parameters are transformed to frequency domain such that $L_{\Delta \sigma_x}$=DFT($\Delta \sigma_x$), $L_{\Delta \sigma_y}$=DFT($\Delta \sigma_y$), $H_{\Delta Mo_x}$=DFT($\Delta Mo_x$), and $H_{\Delta Mo_y}$=DFT($\Delta Mo_y$).

Filters are applied individually to high frequency and low frequency shape information defined as:

$$F_L(\omega^2) = \frac{2a_{0L}a_L + (1-a_{0L})(a_{L^2} + \omega^2)}{a_{L^2} + \omega^2}$$

$$F_H(\omega^2) = 1 - \frac{2a_{0H}a_H + (1-a_{0H})(a_{H^2} + \omega^2)}{a_{H^2} + \omega^2}$$

where $F_L$ is used to filter the low frequency data, in this case $\Delta \sigma$, and $F_H$ is used to filter the high frequency data, $\Delta Mo$. This is calculated over the domain $w^2u^2+v^2$ where u and v are the coordinates of the image, adjusted so (0,0) is in the image center. $F_H$ is the inverse of $F_L$, except with its own $a_0$ and a values where $a_0$, the distance factor, represents the change between low and high frequency and a, the strength factor, represents the cutoff rate between low and high frequency. The typical parameter values are $a_L$ is 50 with range 20-60, $a_{0_L}$ is 1.0 with a range 0.4-2.4, $a_H$ is 1.2 with a range 0.9-20.0, and $a_{0_H}$ is 0.7 with a range 0.5-3.0. Users may adjust the parameter values while receive instant visual feedback of the new depth information.

Finally, surface reconstruction of the workpiece W image is performed. As described above, for every pixel (x, y) in the imager 14 view a (z) value has now been estimated. This provides a 3D point (x, y, z) at every pixel in the imager 14. These equally-spaced points are then connected to form a triangular mesh. This standard 3D data structure can be saved to any standard file type. In an embodiment, by default the mesh is exported to an OBJ file, although other file types are contemplated.

Figure 8:
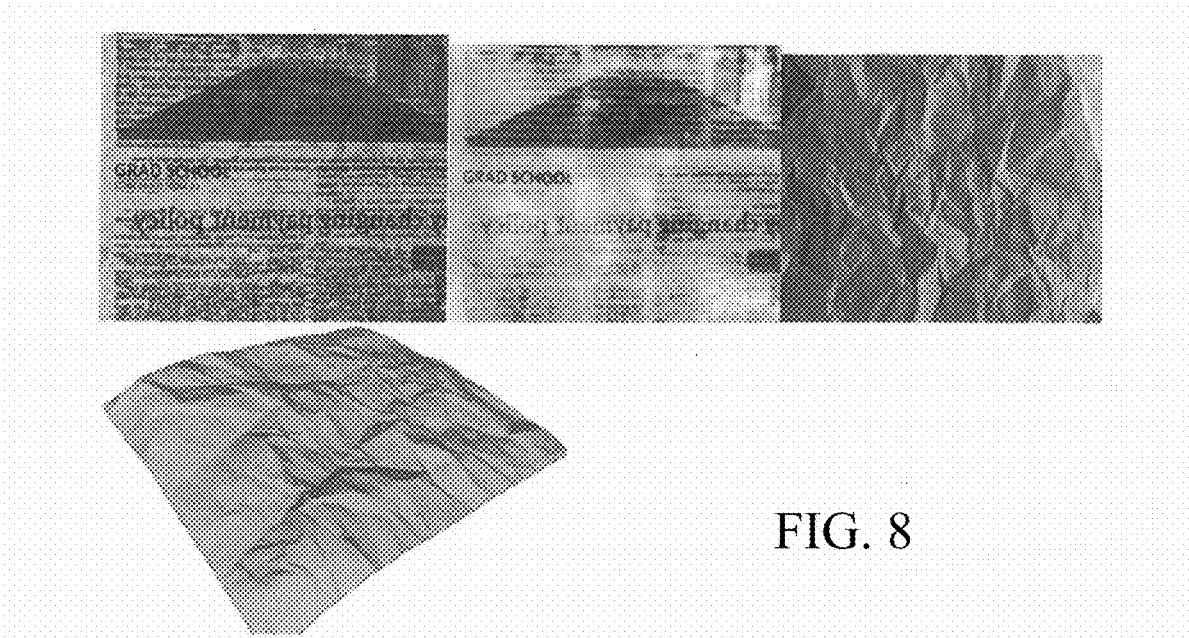
FIG. 8 shows application of the method of the present disclosure to 3D reconstruction of a damaged document.
Figure 9:
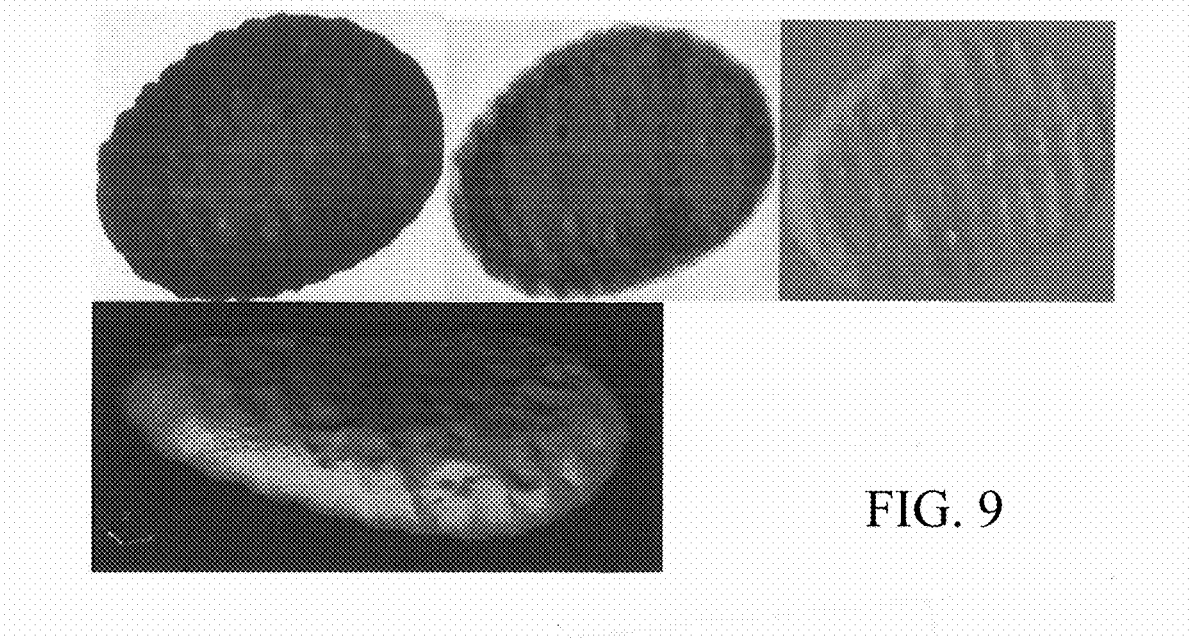
FIG. 9 shows application of the method of the present disclosure to 3D reconstruction of a food item.
Figure 10:
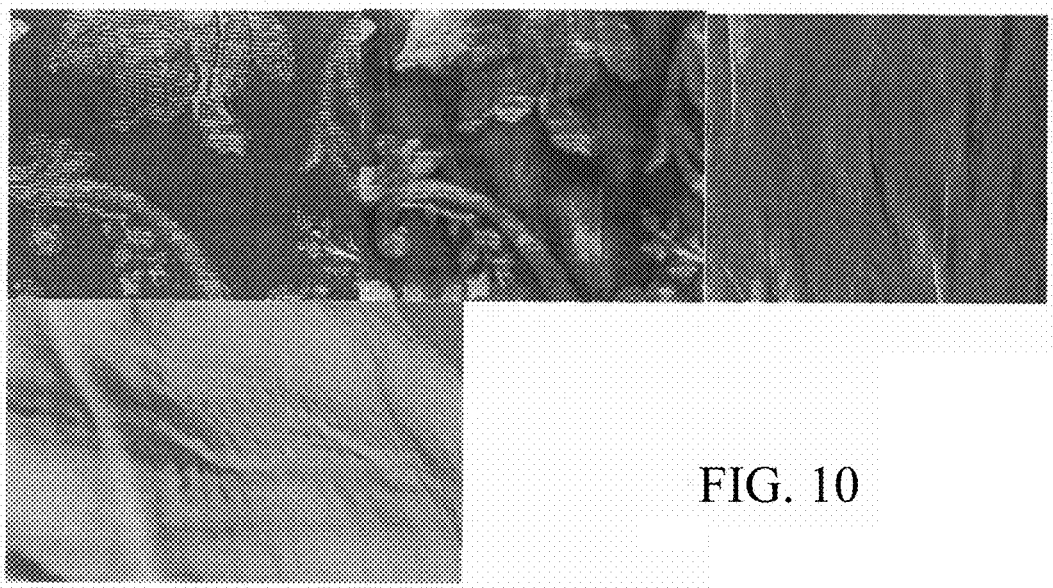
FIG. 10 shows application of the method of the present disclosure to 3D reconstruction of a fabric surface.
Figure 11:
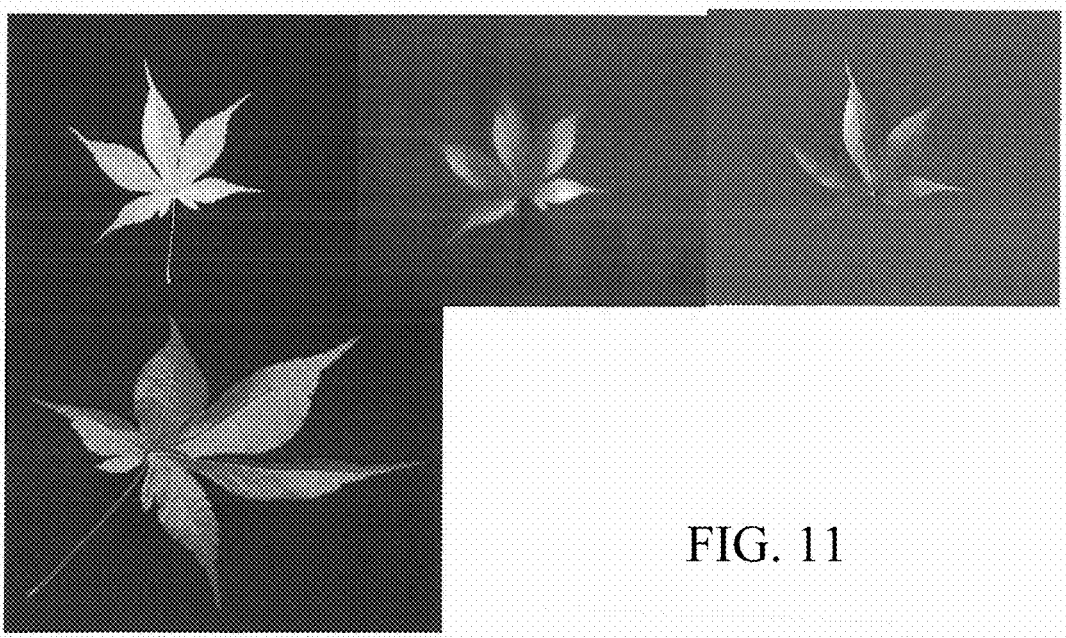
FIG. 11 shows application of the method of the present disclosure to 3D reconstruction of a plant leaf.

It will be appreciated that the present disclosure finds use in 3D reconstruction in a variety of applications. In examples, the methods described herein have been applied to document scanning. FIG. 8 shows a 3D reconstruction of a damaged newspaper scanned at a 612×512 pixel resolution. Other used contemplated include food inspection. FIG. 9 shows a vegetable chip scanned at a 612×512 pixel resolution Likewise, the methods find application in quality assurance for manufacturing. FIG. 10 shows a fabric scanned at a 612×512 pixel resolution. Biological monitoring is also contemplated. FIG. 11 shows a plant leaf scanned at a 612×512 pixel resolution. Without intending any limitation, other applications contemplated include healthcare monitoring and chemical composition/mixture assessment.

One of ordinary skill in the art will recognize that additional embodiments of the invention are also possible without departing from the teachings herein. Thus, the foregoing description is presented for purposes of illustration and description of the various aspects of the invention, and one of ordinary skill in the art will recognize that additional embodiments of the invention are possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures. All such modifications and variations are within the scope of the invention as determined by the appended claims when interpreted in accordance with the breadth to which they are fairly, legally and equitably entitled.

What is claimed:

1. A method of 3-D imaging a workpiece, comprising:
positioning a display screen opposite at least one imager;
by said at least one imager, acquiring multiple calibration images of a first set of multiple light stripes without the workpiece positioned in a display region between the display screen and the imager by (a) displaying and sweeping the first set of multiple light stripes from a first light source in a first directional orientation (x) across each pixel of the display screen wherein the first light source is the display screen; (b) displaying and sweeping the first set of multiple light stripes from the first light source in at least one second directional orientation (y) across each pixel of the display screen with said second directional orientation being different from said first directional orientation; and (c) capturing said calibration images for each position of the first set of multiple light stripes at different exposure times wherein said calibration images provide light intensity values for the first set of multiple light stripes;

by said at least one imager, acquiring a first set of multiple workpiece images by (a) positioning the workpiece in the display region between said display screen and said at least one imager; (b) displaying and sweeping a second set of multiple light stripes from the first light source in the first directional orientation across each pixel of said display screen in the display region being viewed by said imager wherein light from the first light source is transmitted through the workpiece (c) displaying and sweeping the second set of multiple light stripes from the first light source in said at least one second directional orientation across each pixel of said display screen in said display region being viewed by said imager wherein light from the first light source is transmitted through the workpiece, and (d) capturing said first set of multiple workpiece images for each position of said second set of multiple light stripes at different exposure times wherein said first set of multiple workpiece images provide light intensity values for the second set of multiple light stripes;

from said multiple calibration images of the first set of multiple light stripes, by a computing device including at least one processor and at least one memory, determining a calibration profile position (x,y) and a calibration standard deviation for light intensity values of the first set of multiple light stripes;

from said first set of multiple workpiece images, by the computing device, determining the workpiece profile position and the workpiece standard deviation for light intensity values of the second set of multiple light stripes;

from said multiple calibration images and said first set of multiple workpiece images, by the computing device, determining (a) a difference in the calibration profile position and the workpiece profile position and (b) a difference in the calibration standard deviation and workpiece standard deviation, wherein said step of determining the differences in the calibration profile position and the calibration standard deviation caused by said workpiece comprises steps of:

from said first set of multiple workpiece images, estimating Gaussian parameters for said second set of multiple light stripes by said computing device, by (a) rotating the measured light intensity values to center said second set of multiple light stripes over each imager pixel; (b) estimating skew-normal parameters for said light intensity values of said centered second set of multiple light stripes; and (c) estimating Gaussian parameters for said light intensity values of said centered second set of multiple light stripes from said skew-normal parameters;

from said multiple calibration images, estimating Gaussian parameters for said first set of multiple light stripes by said computing device, by (a) rotating measured light intensity values to center said first set of multiple light stripes over each imager pixel; (b) estimating skew-normal parameters for said light intensity values of said centered first set of multiple light stripes; and (c) estimating Gaussian parameters for said light intensity values of said centered first set of multiple light stripes from said skew-normal parameters; and by said computing device, comparing said estimated Gaussian parameters for said light intensity values of said centered second set of multiple light stripes to estimated Gaussian parameters for said light intensity values of said centered first set of multiple light stripes to determine the differences in the calibration profile position and the calibration standard deviation caused by positioning said workpiece in said display region;

from said determined differences, by said computing device calculating a depth value (z) of said workpiece at each imager pixel position (x,y); and from said calculated depth value, by said computing device reconstructing a surface shape of said workpiece.

2. The method of claim 1, further including displaying said reconstructed workpiece surface shape to a user.

3. The method of claim 1, including capturing said first set of multiple workpiece images for each position of said second set of multiple light stripes using five different imager exposure times.

4. The method of claim 1, further including by said computing device estimating a metric position of each of said second set of multiple light stripes on said display screen.

5. The method of claim 4, further including by said computing device completing a metric calibration to compensate for different size pixels on a different display screen.

6. A method of 3-D imaging a multi-layered workpiece having a bottom layer and a top layer and distinguishing a position of a content disposed on a surface of said bottom layer or on a surface of said top layer of the multi-layered workpiece, comprising the steps of:

positioning a first display screen opposite at least one imager;

by said at least one imager, acquiring multiple calibration images of a first set of multiple light stripes without the workpiece positioned in a display region between the display screen and the imager by (a) displaying and sweeping the first set of multiple light stripes from a first light source in a first directional orientation (x) across each pixel of the display screen wherein the first light source is the display screen; (b) displaying and sweeping the first set of multiple light stripes from the first light source in at least one second directional orientation (y) across each pixel of the display screen with said second directional orientation being different from said first directional orientation; and (c) capturing said calibration images for each position of the first set of multiple light stripes at different exposure times wherein said calibration images provide light intensity values for the first set of multiple light stripes;

by said at least one imager, acquiring a first set of multiple workpiece images by (a) positioning the workpiece in the display region between said display screen and said at least one imager; (b) displaying and sweeping a second set of multiple light stripes from the first light source in the first directional orientation across each pixel of said display screen in the display region being viewed by said imager wherein light from the first light source is transmitted through the workpiece (c) displaying and sweeping the second set of multiple light stripes from the first light source in said at least one second directional orientation across each pixel of said display screen in said display region being viewed by said imager wherein light from the first light source is transmitted through the workpiece, and (d) capturing said first set of multiple workpiece images for each position of said second set of multiple light stripes at different exposure times wherein said first set of multiple workpiece images provide light intensity values for the second set of multiple light stripes;

positioning a second light source for emitting light to said top layer surface of the multilayered workpiece, the second light source being disposed on a same side of the multi-layered workpiece as said at least one imager;

by said at least one imager, acquiring a second set of multiple workpiece images of said multi-layered workpiece resulting from light reflecting from the multi-layered workpiece at the same time as the first set of multiple workpiece images is obtained; and comparing said first set of multiple workpiece images and said second set of multiple workpiece images and determining from a difference in the light reflectance from and the transmittance through said multi-layered workpiece whether said content is disposed on said bottom layer or said top layer of said multi-layered workpiece.

7. The method of claim 6, wherein the second light source is a second display screen for displaying and sweeping multiple second display screen light stripes in a the first directional orientation across each pixel of said second display screen in a said display region being viewed by said at least one imager, (b) displaying and sweeping multiple second display screen light stripes in said at least one second directional orientation across each pixel of said second display screen in a the display region being viewed by said at least one imager with said second directional orientation being different from said first directional orientation, and (c) capturing said second set of multiple workpiece images provided by said reflected light for each position of said second display screen multiple light stripes at different exposure times wherein said second set of multiple workpiece images provide light intensity values for said second display screen multiple light stripes;

from said second set of workpiece images, by the computing device, determining a second workpiece profile position (x,y) and a second workpiece standard deviation for light intensity values of said multiple second display screen light stripes;

from the multiple calibration images and said second set of multiple workpiece images, by the computing device, determining (a) a second difference in the calibration profile position and the second workpiece profile position and (b) a second difference in the calibration standard deviation and the second workpiece standard deviation;

from said determined second differences, by said computing device calculating a second depth value (z) of said multi-layered workpiece at each imager pixel position (x, y); and from said calculated depth value, by said computing device reconstructing a second surface shape of said multi-layered workpiece.

8. The method of claim 6, further including by said computing device using a sine-based interpolation to rotate said measured light intensity values and center one of said second set of multiple light stripes over each imager pixel.

9. A system for 3-D imaging a workpiece, comprising:

a display screen wherein said display screen is also a first light source for displaying and sweeping a calibration set of multiple light stripes and a workpiece set of multiple light stripes in a first directional orientation across each pixel of said display screen and for displaying and sweeping the calibration set of multiple light stripes and the first workpiece set of multiple light stripes in at least one second directional orientation across each pixel of said display screen with said second directional orientation being different from said first directional orientation;

at least one imager positioned to acquire a first set of multiple workpiece images of a the workpiece wherein the workpiece is positioned in a display region between the at least one imager and said display screen at different exposure times;

the imager positioned to acquire multiple calibration images without the workpiece positioned in the display region at different exposure times;

at least one non-transitory computer program product operable on a computing device having at least one processor, at least one memory, and at least one graphical user interface;

wherein the at least one computer program product includes executable instructions for acquiring data from the multiple calibration images and the first set of workpiece images, for determining (a) a difference in a calibration profile position (x,y) and a workpiece profile position (x,y) of the calibration set of multiple light stripes and workpiece set of multiple light stripes and (b) a difference in a calibration standard of deviation and a workpiece standard deviation of the calibration set of multiple light stripes and workpiece set of multiple light stripes;

wherein the at least one computer program product includes executable instructions for calculating from the determined differences a depth value (z) of said workpiece at each imager pixel position (x, y), and from said calculated depth value reconstructing a surface shape of said workpiece; and wherein the computer program product includes executable instructions for determining the differences in the calibration profile position and calibration standard deviation caused by said workpiece by:

from said first set of multiple workpiece images, estimating Gaussian parameters for said workpiece set of multiple light stripes by (a) rotating measured light intensity values to center said workpiece set of multiple light stripes over each imager pixel; (b) estimating skew-normal parameters for said light intensity values of said centered workpiece set of multiple light stripes; and (c) estimating Gaussian parameters for said light intensity values of said centered workpiece set of multiple light stripes from said skew-normal parameters;

from said multiple calibration images, estimating Gaussian parameters for said calibration set of multiple light stripes by (a) rotating measured light intensity values to center said calibration set of multiple light stripes; (b) estimating skew-normal parameters for said light intensity values of said centered calibration set of multiple light stripes; and (c) estimating Gaussian parameters for said light intensity values of said centered calibration set of multiple light stripes from said skew-normal parameters; and comparing said estimated Gaussian parameters for said workpiece set of multiple light stripes to estimated Gaussian parameters for said calibration set of multiple light stripes, to determine differences in the calibration profile position and the calibration standard deviation caused by positioning said workpiece in said display region.

10. The system of claim 9, further wherein the computer program product includes executable instructions for displaying said reconstructed workpiece surface shape on the graphical user interface.

11. The system of claim 9, further including a second light source for emitting light to a surface of the workpiece, wherein the workpiece is a multi-layered workpiece and the second light source being is disposed on a same side of the multi-layered workpiece as the at least one imager.

12. The system of claim 11, wherein the second light source is a second display screen for (a) displaying and sweeping multiple second display screen light stripes in a said first directional orientation across each pixel of said second display screen in a said display region being viewed by said at least one imager, (b) displaying and sweeping multiple second display screen light stripes in said at least one second directional orientation across each pixel of said second display screen in a said display region being viewed by said at least one imager with said second directional orientation being different from said first directional orientation.

* * * * *